US011635219B2

(12) United States Patent
Ootsuka et al.

(10) Patent No.: US 11,635,219 B2
(45) Date of Patent: Apr. 25, 2023

(54) IN-FACTORY ENVIRONMENTAL CONTROL SYSTEM

(71) Applicant: FANUC CORPORATION, Yamanashi (JP)

(72) Inventors: Yuuki Ootsuka, Yamanashi (JP);
Shinichi Ogawa, Yamanashi (JP);
Noboru Kurokami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/649,881

(22) Filed: Feb. 3, 2022

(65) Prior Publication Data

US 2022/0154955 A1   May 19, 2022

Related U.S. Application Data

(62) Division of application No. 16/700,814, filed on Dec. 2, 2019, now Pat. No. 11,428,425.

(30) Foreign Application Priority Data

Dec. 4, 2018  (JP) .............................. JP2018-227340

(51) Int. Cl.
*F24F 11/30* (2018.01)
*F24F 11/64* (2018.01)
(Continued)

(52) U.S. Cl.
CPC .............. *F24F 11/30* (2018.01); *F24F 11/64* (2018.01); *F24F 11/65* (2018.01); *F24F 13/00* (2013.01);
(Continued)

(58) Field of Classification Search
None
See application file for complete search history.

(56) References Cited

U.S. PATENT DOCUMENTS

2003/0000931 A1   1/2003   Ueda et al.
2004/0055362 A1   3/2004   Shinohara et al.
(Continued)

FOREIGN PATENT DOCUMENTS

CN   102122003 A   7/2011
CN   102901535 A   1/2013
(Continued)

OTHER PUBLICATIONS

An Office Action mailed by the United States Patent and Trademark Office dated Mar. 31, 2022, issued in U.S. Appl. No. 17/649,881 which is related to U.S. Appl. No. 17/649,881.
(Continued)

*Primary Examiner* — Nathan L Laughlin
(74) *Attorney, Agent, or Firm* — Studebaker & Brackett PC

(57) ABSTRACT

To provide a system that collects data from each sensor (airflow, temperature, humidity, atmospheric pressure, illuminance, and air pollution) that measures an environmental factor and can evaluate an environment in a factory in a complex manner. Environmental sensors that measure environmental elements including at least airflow from among the airflow, temperature, humidity, atmospheric pressure, illuminance, and a degree of air pollution, which are the environmental elements in a factory where a machining operation is performed, a display unit that visualizes and displays measurement results of a plurality of environmental elements measured by the environmental sensors, an evaluation and determination unit that evaluates and determines at least one of machine accuracy, work environment, and image accuracy based on the measurement results of the plurality of environmental elements, and a control unit that controls in-factory equipment so that an environment in the factory becomes a preset environment based on results of
(Continued)

evaluation and determination by the evaluation and determination unit are included.

9 Claims, 1 Drawing Sheet

(51) Int. Cl.
　　　*F24F 11/65*　　　(2018.01)
　　　*F24F 13/00*　　　(2006.01)
　　　*G05B 19/042*　　 (2006.01)
　　　*F24F 110/20*　　 (2018.01)
　　　*F24F 110/50*　　 (2018.01)
　　　*F24F 110/64*　　 (2018.01)
　　　*F24F 110/66*　　 (2018.01)
　　　*F24F 110/10*　　 (2018.01)

(52) U.S. Cl.
　　　CPC ........ *G05B 19/042* (2013.01); *F24F 2110/10* (2018.01); *F24F 2110/20* (2018.01); *F24F 2110/50* (2018.01); *F24F 2110/64* (2018.01); *F24F 2110/66* (2018.01); *F24F 2221/02* (2013.01); *G05B 2219/2614* (2013.01)

(56) References Cited

U.S. PATENT DOCUMENTS

| | | |
|---|---|---|
| 2006/0033678 A1 | 2/2006 | Lubomirsky et al. |
| 2007/0072541 A1 | 3/2007 | Daniels, II et al. |
| 2010/0101264 A1 | 4/2010 | Nishino et al. |
| 2011/0200245 A1 | 8/2011 | Crothers |
| 2013/0265064 A1 | 10/2013 | Hamann et al. |
| 2015/0012142 A1 | 1/2015 | Koga |
| 2015/0271819 A1 | 9/2015 | Tomida et al. |
| 2016/0048143 A1 | 2/2016 | Chan et al. |
| 2016/0148098 A1 | 5/2016 | Barhorst et al. |
| 2016/0359325 A1* | 12/2016 | Kawata ................. G16H 50/50 |
| 2019/0156598 A1* | 5/2019 | Palmer, Jr. ........... G01N 17/006 |
| 2020/0003448 A1 | 1/2020 | Schwegler et al. |

FOREIGN PATENT DOCUMENTS

| | | |
|---|---|---|
| CN | 205541324 U | 8/2016 |
| CN | 108463996 A | 8/2018 |
| JP | H09-319420 A | 12/1997 |
| JP | 2001-099462 A | 4/2001 |
| JP | 2012-247078 A | 12/2012 |
| JP | 2015-095754 A | 5/2015 |
| JP | 2015-170937 A | 9/2015 |
| JP | 2015-230638 A | 12/2015 |
| JP | 2016-529111 A | 9/2016 |
| JP | 2017-091242 A | 5/2017 |
| WO | 2010/016610 A1 | 2/2010 |

OTHER PUBLICATIONS

An Office Action mailed by China National Intellectual Property Administration dated Mar. 16, 2022, which corresponds to Chinese Patent Application No. 201911213873.X and is related to U.S. Appl. No. 17/649,881; with English language translation.

An Office Action; "Notice of Reasons for Refusal," mailed by the Japanese Patent Office dated Sep. 20, 2022, which corresponds to Japanese Patent Application No. 2018-227340 and is related to U.S. Appl. No. 17/649,881; with English language translation.

An Office Action mailed by China National Intellectual Property Administration dated Aug. 15, 2022, which corresponds to Chinese Patent Application No. 201911213873.X and is related to U.S. Appl. No. 17/649,881.

An Office Action; "Notice of Reasons for Refusal," mailed by the Japanese Patent Office dated Mar. 16, 2021, which corresponds to Japanese Patent Application No. 2018-227340 and is related to U.S. Appl. No. 16/700,814 ; with English language translation.

An Office Action; "Notice of Reasons for Refusal," mailed by the Japanese Patent Office dated Jul. 13, 2021, which corresponds to Japanese Patent Application No. 2018-227340 and is related to U.S. Appl. No. 16/700,814; with English language translation.

* cited by examiner

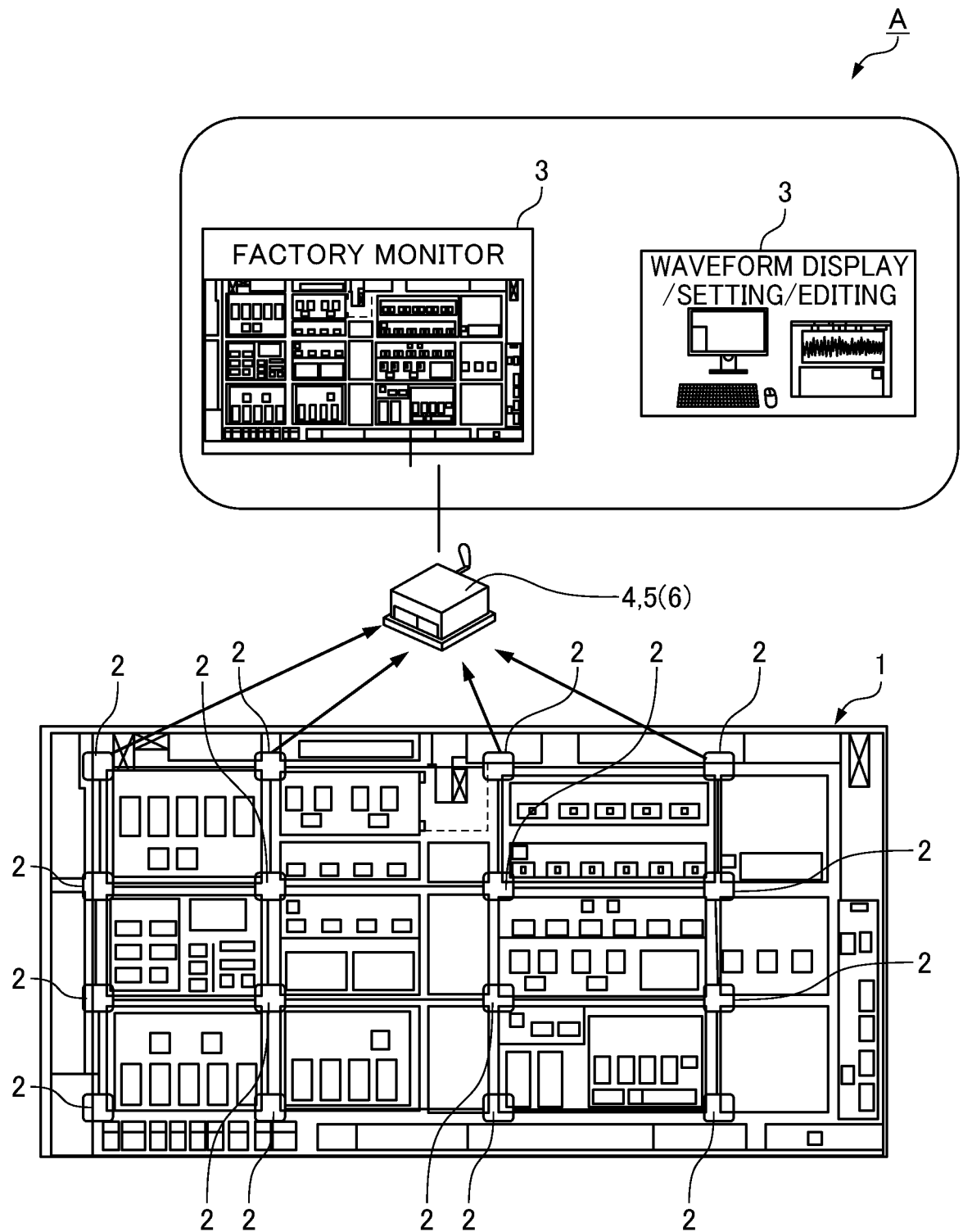

IN-FACTORY ENVIRONMENTAL CONTROL SYSTEM

This application is a Divisional of U.S. patent application Ser. No. 16/700,814 filed on Dec. 2, 2019, which is based on and claims the benefit of priority from Japanese Patent Application No. 2018-227340, filed on Dec. 4, 2018, the contents of which are incorporated herein by reference.

BACKGROUND OF THE INVENTION

Field of the Invention

The present invention relates to in-factory environmental control systems, and more particularly, to a system for controlling an environment in a factory in which a machining operation is performed with a machining machine such as a machine tool.

Related Art

Conventionally, in the interior of a factory, such as a machining area where a machining operation is performed with a machining machine such as a machine tool, and a warehouse area where raw materials, machined products, and the like are stocked, the control of temperature and humidity, the removal of dust, and the like are performed by using an air conditioner, various filters, and the like.

Incidentally, Patent Document 1 discloses a ventilation air volume control system in a clean room in a semiconductor factory or the like, and the ventilation air volume control system includes a power sensor, an air flow sensor, a particle sensor, an air speed and air direction sensor, a ventilator, a control unit, and a display. The ventilation air volume control system is configured as follows: the air flow sensor measures the flow of compressed air supplied to a manufacturing apparatus through piping, the particle sensor measures the number of dust particles (the amount of particles) in a manufacturing room, the air speed and air direction sensor measures the speed and direction of airflow flowing from the inside to the outside of the manufacturing room, each measured value is transmitted to the control unit, and a graph showing measured values of air consumption (air flow) is displayed on the display at every constant time.

Patent Document 1: Japanese Unexamined Patent Application, Publication No. 2012-247078

SUMMARY OF THE INVENTION

Herein, in a factory in which a machining operation is performed, as a measure against the occurrence of defective machining due to change of machine posture associated with in-factory environment, the environment around the machining tool may be changed.

However, if defective machining occurs, the presence of abnormality of a machine such as a machining tool is commonly confirmed first. Therefore, if in-factory environment is a factor in causing the defective machining, it would take a considerable amount of time to identify such a factor.

In addition, a great deal of expertise and experience are required to identify factors leading to defective machining, and only a limited number of people can identify factors arising from an in-factory environment as well as machine abnormality.

Furthermore, with respect to a change in work environment, improvements and measures are undertaken based on indications from workers. However, how to sense a change in work environment largely depends on workers. There may be cases in which it is not indicated if the body of a worker becomes accustomed to the change. In some cases, the discovery of a serious problem may be delayed, resulting in a response after the occurrence of a health hazard.

In view of the above circumstances, it is an object of the present invention to provide a system that collects data from each sensor (airflow, temperature, humidity, atmospheric pressure, illuminance, and air pollution) that measures an environmental factor and can evaluate an environment in a factory in a complex manner.

The present inventors have found a way to easily determine whether defective machining is due to in-factory environment, and have thus completed the present invention.

A first aspect of the present invention is characterized by including environmental sensors that measure environmental elements including at least airflow from among the airflow, temperature, humidity, atmospheric pressure, illuminance, and the degree of air pollution, which are the environmental elements in a factory where a machining operation is performed; a display unit that visualizes and displays measurement results of a plurality of environmental elements measured by the environmental sensors; an evaluation and determination unit that evaluates and determines at least one of machine accuracy, work environment, and image accuracy based on the measurement results of the plurality of environmental elements; and a control unit that controls in-factory equipment so that an environment in the factory becomes a preset environment based on results of evaluation and determination by the evaluation and determination unit.

In a second aspect of the present invention according to the first aspect, a measurement target of the degree of air pollution of the environmental elements may be PM2.5.

According to the present invention, by providing environmental sensors that measure air flow, temperature, humidity, atmospheric pressure, illuminance, and the degree of air pollution, which are the environmental elements in the factory where a machining operation is performed and analyzing the measurement results of the environmental sensors in a complex manner, or by installing each environmental sensor at a different height around a machining machine or on a factory column or the like or on a factory column or the like and constantly monitoring the in-factory environment three-dimensionally, it is possible to grasp the statuses of airflow, temperature, humidity, atmospheric pressure, illuminance, and the degree of air pollution in the factory where the machining operation is performed, as well as the relationship between the machining operation and each environmental element, and the like. In addition, the present invention can be applied to the adjustment of air conditioning and the improvement of equipment so that the in-factory environment becomes uniform. Furthermore, it is possible to show monitoring results of the in-factory environment with numerical values, colors, vector expressions, graphs, and the like on an in-factory map, and to intuitively grasp the in-factory environment.

This makes it possible to prevent defective machining from occurring due to the change of each environmental element associated with the machining operation, for example, due to change of machine posture associated with the in-factory environment. In addition, if defective machining occurs, it is possible to reduce man-hours required for identifying a cause to taking measures. Moreover, it is possible to reduce a burden on a worker due to work environment, to increase work efficiency, and to prevent a health hazard from occurring.

BRIEF DESCRIPTION OF THE DRAWINGS

The FIGURE is a diagram illustrating an in-factory environmental control system according to an embodiment of the present invention.

DETAILED DESCRIPTION OF THE INVENTION

With reference to the FIGURE, an in-factory environmental control system according to an embodiment of the present invention will be described.

Herein, the in-factory environmental control system according to the present embodiment relates to a system for controlling an environment in a factory in which a machining operation is performed using a machining machine such as a machine tool.

Specifically, as shown in the FIGURE, the in-factory environmental control system A of the present embodiment is provided at an arbitrary position in a factory 1, and includes: environmental sensors 2 that measure environmental elements, i.e., airflow, temperature, humidity, atmospheric pressure, illuminance, and the degree of air pollution in the factory 1; a display unit 3 that visualizes and displays a plurality of measurement results of the environmental elements measured by the environmental sensors 2; an evaluation and determination unit 4 that evaluates and determines at least one of machine accuracy, work environment, and image accuracy (visibility of objects and monitors, visible performance, etc.) based on the plurality of the measurement results of the environmental elements; and a control unit 5 that controls in-factory equipment so that an environment in the factory 1 becomes a preset environment based on the results of evaluation and determination by the evaluation and determination unit 4.

Herein, the environmental sensors 2 may be sensors (separate measurement devices) that individually measure each of airflow, temperature, humidity, atmospheric pressure, illuminance, and the degree of air pollution, or the sensor may measure at least two of the environmental elements and be included in a measurement device.

In addition, if a plurality of the environmental elements including at least airflow are measured in the factory 1, all of the environmental elements, i.e., airflow, temperature, humidity, atmospheric pressure, illuminance, and the degree of air pollution, may not be necessarily measured.

The environmental sensors 2 are installed at arbitrary positions in the factory 1 and are preferably installed at different heights around a machining machine or on a factory column or the like.

The degree of air pollution is, for example, PM2.5.

The evaluation and determination unit 4 that evaluates and determines at least one of machine accuracy, work environment, and image accuracy based on the plurality of the measurement results of the environmental elements, and the control unit 5 that controls the in-factory equipment so that the environment in the factory 1 becomes a preset environment based on the results of the evaluation and determination by the evaluation and determination unit 4, are provided in, for example, a controller (control system) 6.

The in-factory equipment controlled by the control unit 5 is, for example, an air conditioner, a lighting device, a humidifier/dehumidifier, and an air supply/exhaust device.

The display unit 3 is provided in, for example, a centralized control room, and visualizes and displays the plurality of the measurement results of the environmental elements measured by the environmental sensors 2. Further, the display unit 3 displays the result and status of determination by the evaluation and determination unit 4.

The display unit 3 of the present embodiment displays airflow measured, for example, in the form of a vector of an air direction and air volume. The display unit 3 displays temperatures and humidity measured in the form of a distribution map by color or discomfort indices. The difference between a measured atmospheric pressure and the outside air is calculated, and its transition (change with time) is graphically displayed. Illuminances or the degrees of air pollution measured are displayed in the form of a distribution map by color, or its transition is graphically displayed.

Further, in the in-factory environmental control system A of the present embodiment configured as above, the environmental sensors 2 that measure the environmental elements, i.e., airflow, temperature, humidity, atmospheric pressure, illuminance, and the degree of air pollution in the factory 1 where a machining operation is performed, is provided. By analyzing the measurement results of the environmental sensors 2 in a complex manner or by installing each environmental sensor 2 at a different height around a machining machine or on a factory column or the like, and constantly monitoring in-factory environment three-dimensionally, it is possible to grasp the statuses of air flow, temperature, humidity, atmospheric pressure, illuminance, and the degree of air pollution in the factory 1 where a machining operation is performed, as well as the relationship between the machining operation and each environmental element, and the like.

In addition, the in-factory environmental control system A of the present embodiment can be applied to the adjustment of air conditioning and the improvement of equipment so that the in-factory environment becomes uniform. Furthermore, it is possible to show monitoring results of the in-factory environment with numerical values, colors, vector expressions, graphs, and the like on an in-factory map, and to intuitively grasp the in-factory environment.

Therefore, according to the in-factory environmental control system A of the present embodiment, it is possible to prevent defective machining from occurring due to the change of each environmental element associated with the machining operation, for example, due to change of machine posture associated with the in-factory environment. In addition, if defective machining occurs, it is possible to reduce man-hours required for identifying a cause to taking measures.

Moreover, it is possible to reduce a burden on a worker due to work environment, to increase work efficiency, and to prevent a health hazard from occurring.

Herein, the in-factory environmental control system A of the present embodiment may include a mechanism whereby the change of static accuracy of a machine is estimated from the measurement results of temperature and airflow obtained by the environmental sensors 2 and machine information obtained in advance by another method (for example, a machine temperature of a machine tool (machining machine)) and a compensation is applied to a machining program of a CNC (computer numerical control) device or the like. If it is configured in this manner, the change of the static accuracy of the machine can be grasped and estimated, and the machining program is compensated, thereby reflecting the machining operation. As a result, it is possible to prevent defective machining from occurring due to the change of the static accuracy of the machine associated with the in-factory environment. In addition, if defective machining occurs, it is possible to reduce man-hours required for identifying a cause to taking measures.

In addition, the in-factory environmental control system A of the present embodiment may include a mechanism whereby the risk level of heatstroke is divided into several stages based on the measurement results of temperature and humidity obtained by the environmental sensors 2 and displayed on a factory monitor provided in a factory centralized control room or the like and optimum air conditioning and ventilating methods are specified. This configuration can greatly reduce the risk of the onset of heatstroke in people in the factory, such as workers.

Furthermore, the in-factory environmental control system A of the present embodiment may include a mechanism whereby a warning is provided to a machine that generates a large amount of mist of a cutting fluid during machining based on the measurement results of the degree of air pollution being PM2.5 and airflow obtained by the environmental sensors 2 and instructions are provided for maintenance of a mist collector. In this configuration, it is possible to prevent operation from being performed in a state where the air environment in the factory is deteriorated, and it is possible to effectively prevent people in the factory, such as workers, from taking PM2.5 into the body, thus causing a health hazard.

Furthermore, the in-factory environmental control system A of the present embodiment may include a mechanism whereby a factory monitor provides a warning of a risk level of rust generation on an iron casting based on the measurement results of temperature and humidity obtained by the environmental sensors 2 and information of a cutting fluid (for example, concentration and pH) obtained in advance by another method. In this instance, it is possible to prevent rust from occurring due to the influence of the cutting fluid on iron castings such as machine equipment in the factory, the structural materials of the factory, and machining raw materials (machining materials) in the factory. This makes it possible to extend the life of the equipment and the like, to prevent a reduction in productivity due to rust, and to provide machined products with high reliability.

The above description has been given of an embodiment of the in-factory environmental control system of the present invention, but the present invention is not limited to the above-described embodiment and can be modified as appropriate without departing from the spirit of the present invention.

EXPLANATION OF REFERENCE NUMERALS

1 FACTORY
2 ENVIRONMENTAL SENSOR
3 DISPLAY UNIT
4 EVALUATION AND DETERMINATION UNIT
5 CONTROL UNIT
6 CONTROLLER
A IN-FACTORY ENVIRONMENTAL CONTROL SYSTEM

What is claimed is:

1. An in-factory environmental control system, comprising:
　　environmental sensors that measure a plurality of environmental elements including at least airflow from among the airflow, temperature, humidity, atmospheric pressure, illuminance, and a degree of air pollution, which are the environmental elements in a factory where a machining operation is performed;
　　a display unit that visualizes and displays measurement results of the plurality of environmental elements measured by the environmental sensors;
　　an evaluation and determination unit that evaluates and determines at least one of a static accuracy of a machine, work environment, and image accuracy based on the measurement results of the plurality of environmental elements; and
　　a control unit that controls in-factory equipment so that an environment in the factory becomes a preset environment based on results of evaluation and determination by the evaluation and determination unit,
　　wherein the in-factory environmental control system has a mechanism that estimates a change in the static accuracy of the machine from the measurement results of the temperature and the airflow measured by the environmental sensors and machine information obtained in advance by another method and a compensation is applied to a machining program based on the estimated change in the static accuracy.

2. The in-factory environmental control system according to claim 1, wherein the display unit displays the measured airflow in a form of a vector of an air direction and air volume.

3. An in-factory environmental control system, comprising:
　　environmental sensors that measure a plurality of environmental elements including at least airflow from among the airflow, temperature, humidity, atmospheric pressure, illuminance, and a degree of air pollution, which are the environmental elements in a factory where a machining operation is performed;
　　a display unit that visualizes and displays measurement results of the plurality of environmental elements measured by the environmental sensors;
　　an evaluation and determination unit that evaluates and determines at least one of machine accuracy, work environment, and image accuracy based on the measurement results of the plurality of environmental elements; and
　　a control unit that controls in-factory equipment so that an environment in the factory becomes a preset environment based on results of evaluation and determination by the evaluation and determination unit,
　　wherein the in-factory environmental control system has a mechanism that causes a factory monitor to provide a warning of a risk level of rust generation on an iron casting based on the measurement results of the temperature and the humidity measured by the environmental sensors and information of a cutting fluid obtained in advance by another method.

4. An in-factory environmental control system, comprising:
　　environmental sensors that measure a plurality of environmental elements including at least airflow from among the airflow, temperature, humidity, atmospheric pressure, illuminance, and a degree of air pollution, which are the environmental elements in a factory where a machining operation is performed;
　　a display unit that visualizes and displays measurement results of the plurality of environmental elements measured by the environmental sensors;
　　an evaluation and determination unit that evaluates and determines at least one of machine accuracy, work environment, and image accuracy based on the measurement results of the plurality of environmental elements; and
　　a control unit that controls in-factory equipment so that an environment in the factory becomes a preset environment based on results of evaluation and determination by the evaluation and determination unit, wherein the in-factory environmental control system has a mechanism that divides a risk level of heatstroke into several stages based on the measurement results of the temperature and the humidity measured by the environmental sensors and displayed on a factory monitor, and optimum air conditioning and ventilating methods are indicated based on the risk level of the heatstroke.

5. The in-factory environment control system according to claim 4, wherein the display unit displays the measured airflow in a form of a vector of an air direction and air volume.

6. The in-factory environment control system according to claim 3, wherein the display unit displays the measured airflow in a form of a vector of an air direction and air volume.

7. The in-factory environment control system according to claim 1, wherein each of the measurement sensors is installed at a different height around a machine tool or on a column of the factory.

8. The in-factory environment control system according to claim 4, wherein each of the measurement sensors is installed at a different height around a machine tool or on a column of the factory.

9. The in-factory environment control system according to claim 3, wherein each of the measurement sensors is installed at a different height around a machine tool or on a column of the factory.

* * * * *